Feb. 26, 1924.
G. A. LYON
BRACE BAR AUTOMOBILE BUFFER
Filed May 14, 1923
1,485,043
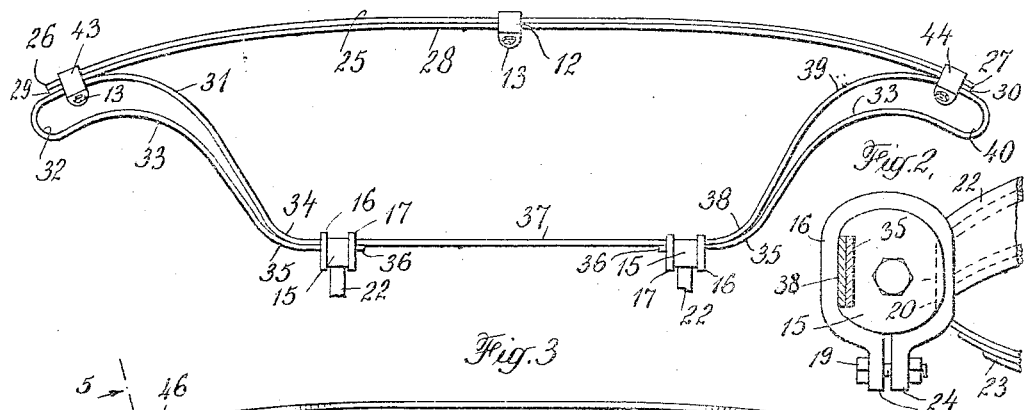
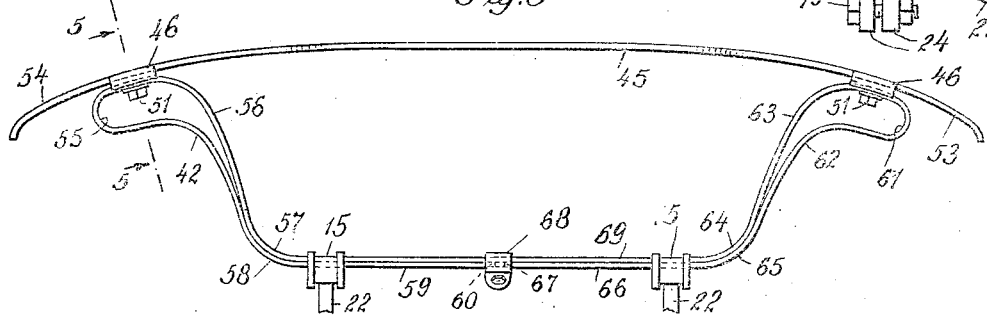
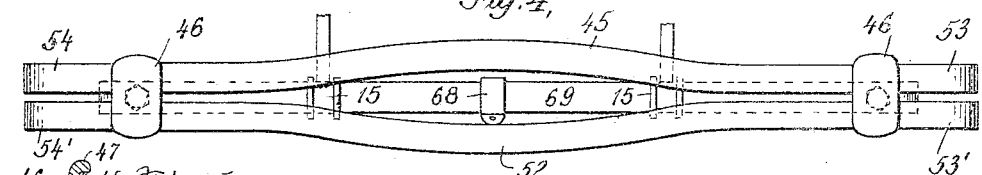
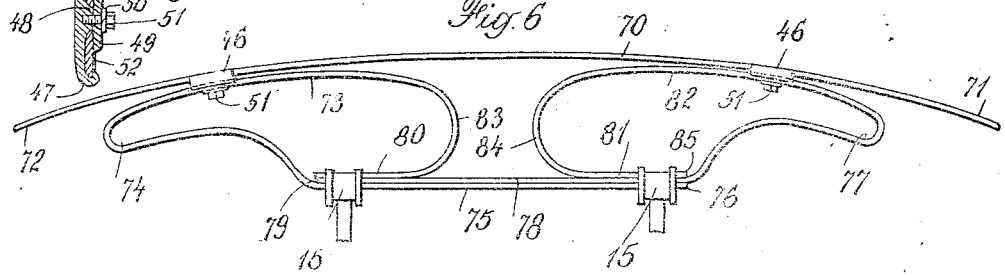
INVENTOR
George Albert Lyon
BY
Harry L. Dunean
ATTORNEY.

Patented Feb. 26, 1924.

1,485,043

UNITED STATES PATENT OFFICE.

GEORGE ALBERT LYON, OF PHILADELPHIA, PENNSYLVANIA.

BRACE-BAR AUTOMOBILE BUFFER.

Application filed May 14, 1923. Serial No. 638,702.

*To all whom it may concern:*

Be it known that I, GEORGE ALBERT LYON, a citizen of the United States, and resident of Philadelphia, county of Philadelphia, State of Pennsylvania, have made certain new and useful Inventions Relating to Brace-Bar Automobile Buffers, of which the following is a specification taken in connection with the accompanying drawing.

This application is a partial continuation of my copending application, filed February 12, 1920, as Serial No. 358,239 and renewed February 4, 1921 as Serial No. 534,275; that is, this case contains subject matter taken therefrom.

This invention relates especially to automobile buffers with which may be combined brace bars, supporting members, or auxiliary buffer portions which may be secured or connected to the automobile or other vehicle frame members to reenforce and strengthen them. For this purpose special frame ends which may be riveted or otherwise connected to the forward ends of portions of the usual channel section frame members of the vehicle may advantageously be provided with laterally extending supporting bosses on one or both sides of each frame member and an enclosing supporting clamp may cooperate with each boss which, if desired, may be recessed to receive and align the brace bar portion. The brace bar portions may thus be securely clamped or connected to each of the frame members so as to have a desirable reenforcing action thereon and at the same time support the buffer front of any suitable construction which may be in the same plane or bent upwards in some cases so as to be arranged in a higher plane than the connected rear supporting portions. The brace bar or supporting portions may, if desired, have integrally or otherwise connected loops and adjacent inturned connector portions to which may be detachably or otherwise connected the buffer front portions preferably formed of spring strip or other resilient elements, so that these impact receiving members may have the desired resilient action under collision conditions. It is sometimes desirable to form the brace bar or supporting portion of the buffer of one or more pieces of resilient spring steel strip which may have doubled outwardly and forwardly curved resilient portions which may comprise looped front connector portions adapted to rearwardly engage and support a buffer front. Any suitable type of buffer front may be used and adjustably or otherwise connected to the front connector portions as by any suitable clamping or connecting devices. For many purposes it is desirable to use multiple strip members which may comprise overlapping or reenforced multiple strip vertically widened separated central portions in some cases, while the ends of these connected front strips may project outward so as to form free ends that extend out to and end at the automobile wheels as covered by the Lyon Patent No. 1,247,300, of November 20, 1917.

In the accompanying drawing showing in a somewhat diagrammatic way various illustrative embodiments of this invention:

Fig. 1 is a top view showing an illustrative buffer.

Fig. 2 is an enlarged side section thereof showing an illustrative form of connection.

Fig. 3 is a top view of another illustrative buffer.

Fig. 4 is a front view thereof.

Fig. 5 is an enlarged transverse section taken substantially along the line 5—5 of Fig. 3, and Fig. 6 is a top view of another illustrative buffer.

Fig. 1 shows an illustrative buffer in which the brace bar or auxiliary rear portion may be formed of one or more strips of tempered spring steel or other resilient strip and may have double looped connector portions so as to from the integral end loops 32, 40 and cooperating inturned connector portions extending out into protective position adjacent the vehicle wheels, if desired. The end loop 32 may have the duplex connected portions 31, 33 of the strip which may be brought together at 34, 35 adjacent the end of this brace bar supporting portion 37 so that these duplex ends or portions thereof may be securely clamped to the supporting bosses 15 as by the supporting clamps 16, 17 of suitable construction. Any one or more strips on the other side of the brace bar portion may have the end loop 40 similarly supported by duplex portions 33, 39 and 35, 38, which, if desired, may be integral with the strip on the other side of the supporting or brace bar element, although this is not of course necessary in all cases. The buffer front may in this case be formed of one or more strips or elements of spring steel or other resilient material, such as 25, 28, which may have the ends 26, 29 extend out toward or beyond the end loop portion 32 or the adjacent inwardly extending connector portion cooperating therewith to which they may be clamped or connected as by the enclosing clamping device or clip 43 having the bolt or nut 13. The other ends 27, 30 of such usual impact receiving strips or members may be similarly connected to the connector portion adjacent the other end loop portion 40 by a similar clamping device or clip 44 while one or more intermediate clips 12 may be used on this type of front portion.

The supporting or brace bar portions of the buffer may as indicated in Fig. 2 be clamped or connected to supporting bosses 15 which may extend on one or both sides of the special frame ends rigidly connected to the usual channeled frame members or goose necks 22. Any convenient means for connecting these parts may be used and as indicated the supporting boss which may project on both sides of the frame member may be formed with an integral supporting or securing portion extending within the channeled frame member and welded, riveted or otherwise connected thereto in a rigid way. This supporting boss may of course accommodate the end of the usual spring 23 which may be secured by the usual spring hanger bolt indicated passing through the boss if desired. This supporting boss may be formed with a recess of such size as to accommodate the one or more spring strips 35, 38 constituting this supporting brace bar portion of the buffer and a straight or rectangular sectioned recess of this character may support the flat sectioned strips in connection with a supporting clamp, such as 16, which may be arranged around these parts and strongly clamped upon the same as by a tightening bolt 19 passing through the ends 24 of this clamp. It is usually advantageous to form the one or more bosses provided on each frame member with a retainer lug or portion projecting outward to at least a slight extent beyond the cooperating face 20 of the boss which may be substantially flat or vertical, if desired. The supporting clamp of wrought or malleable material may be sufficiently expanded to be slipped over this retainer portion and then tightened inside the same which definitely holds the parts in this securing position and positively prevents the clamps slipping sidewise from the supporting boss. As indicated in Fig. 1 two such supporting clamps 16, 17 may be used on each supporting boss or frame end 15 and in this way an amply strong and rigid connection may be secured between the supporting or brace bar portion of the buffer and the frame ends so as to considerably strengthen and reenforce them against lateral yielding and breakage.

Fig. 3 shows another illustrative buffer of this general type in which the rear buffer supporting member of spring steel strip or the like may have a laterally extending or brace bar portion formed of several such steel strips to which the forwardly and outwardly extending doubled strips may be integrally connected so as to securely and yet resiliently support the looped connector portions in front of this brace bar or rear supporting portion of the buffer. As illustrated in Fig. 3, this laterally extending supporting member may comprise the spring steel strip 69 and also one or more additional reenforcing thicknesses of the strip ends such as 59, 66 which may extend in each case entirely across this rear brace bar portion between the built in frame ends 15 or may have the ends 60, 67 of this strip brought into substantial alignment and clamped to the other strip 69 as by the clamping device 68. The doubles strips 57, 58 at the left of this rear supporting or brace bar portion may extend outward and forward in curved position so as to resiliently support the looped connector portion 55 through the curved portions 42, 56 of this strip. A similar resilient curved doubled portion of this strip 62, 63, 64 and 65 may similarly support the looped connector portion 61 at the other side of the buffer front and considerably ahead of the rear brace bar portion, as indicated. Any suitable type of buffer front may be used in this connection and for example one or more front strips or plates of tempered spring steel or the like may be adjustably or otherwise clamped or connected to these connector portions. As shown in Figs. 3 and 4, two vertically separated front strips 45, 52, are used and provided, if desired, with oppositely bent vertically widened central portions indicated in Fig. 4, where additional vertical width is desired at this point of the buffer front. The outer portions of these front strips may advantageously be more closely spaced in their vertically separated or other position and these strip ends such as 53 and 53′ and 54, 54′ may extend outward to and end at the lateral buffer ends and form rearwardly inclined end portions of the buffer front considerably beyond the connector portions, if desired. Both of these strips may directly engage with and be supported by the rearwardly located connector portions of the supporting members. These parts may be detachably and adjustably connected, if desired, by suitable clamping members 46 shown in greater detail in Fig. 5. These clamping members may, if desired, have overlapping upper and lower edge portions 47 adapted to extend more or less around the buffer strips such as 45, 52, while a clamping bolt 51 may be threaded into the central portion 48 of the clamping member so as to tightly screw the connector portion or strip such as 49 into engagement with the two front strips, a lock washer 50 being used, if desired, to prevent these parts working loose.

Fig. 6 shows another illustrative buffer in which the rear suporting or brace bar portion which may extend between the frame ends 15, may be similarly formed of a plurality of overlapping steel strip members such as 75, 78. Each of these rear strips may be integrally connected with a forwardly located looped connector portion, the strip 75 having an integral portion 74 forming an outer looped connector portion while the strip then bends inward at 73 to form an inturned or central loop 83, the strip then being bent rearward at 80 and its end 79 then being brought outward so as to be engaged by the clamps on the frame end. The other strip 78 may have resilient curved portions such as the outer looped connector portion 77, the forward curve 82 and the connected inturned central connector loop 84, the rear portion of the strip 81 being continued to 85 within the clamping devices securing all of these right hand strips to the frame end 15. These doubled curved supporting portions thus have somewhat similar resilient cushioning action and yieldingly support the front or looped connector portions at the desired distance ahead of the brace bar portion or other supporting members which may be connected to the automobile frame. One or more front strips or plates such as the forwardly curved or arched front strips 70 may be used with this form of buffer and may be rigidly connected to the looped connector portions by similar clamping members 46 and clamping bolts 51 as above described. These front strips may also have rearwardly inclined free ends 71, 72 extending outward to the lateral ends of the buffer and in front of the automobile wheels, if desired.

This invention has been described in connection with a number of embodiments, forms, proportions, sizes, parts, arrangements, materials, methods of construction, connection and use, to the details of which disclosure the invention is not of course to be limited, since what is claimed as new and what is desired to be secured by Letters Patent is set forth in the appended claims:

1. The automobile buffer comprising a multiple strip laterally extending rear buffer supporting member of tempered spring steel strip adapted to extend between and be rigidly connected to the built in frame ends of the automobile, and having duplex outwardly and forwardly projecting curved resilient strip portions each formed with a looped front connector portion adapted to rearwardly engage and support a buffer front, and a forwardly arched vertically wide multiple strip buffer front having an oppositely bent vertically widened center portion and having closely spaced vertically separated lateral connecting portions adjustably clamped to said connector portions and having outwardly extending rearwardly inclined free ends extending to and ending at the lateral ends of the buffer and adapted to extend into protective position in front of the automobile wheels.

2. The automobile buffer comprising a multiple strip laterally extending rear buffer supporting member of steel strip adapted to extend between and be rigidly connected to the frame ends of the automobile, and having duplex outwardly and forwardly projecting curved resilient strip portions each formed with a looped front connector portion adapted to support a buffer front, and a multiple strip buffer front having an oppositely bent vertically widened center portion and having closely spaced lateral connecting portions clamped to said connector portions and having outwardly extending free ends extending to and ending at the lateral ends of the buffer and adapted to extend into protective position in front of the automobile wheels.

3. The automobile buffer comprising a multiple steel strip laterally extending rear buffer supporting member adapted to extend between and be rigidly connected to the frame of the automobile, and having on both sides duplex forwardly extending curved resilient strip portions each formed with a looped front connector portion adapted to rearwardly engage and support a buffer front, and a forwardly arched multiple strip buffer front having a vertically widened center portion and having lateral connecting portions secured to said connector portions and having outwardly extending free ends extending to and ending at the lateral ends of the buffer.

4. The automobile buffer comprising a multiple steel strip laterally extending rear buffer supporting member adapted to extend between and be connected to the frame of the automobile, and having on both sides duplex forwardly extending curved resilient strip portions each formed with a looped connector portion adapted to support a buffer front, and a multiple strip buffer front having a vertically widened center portion and having lateral connecting portions secured to said connector portions and having outwardly extending free ends extending to and ending at the lateral ends of the buffer.

5. The automobile buffer comprising a multiple strip laterally extending rear buffer supporting member of steel strip adapted to extend between and be rigidly connected to the frame ends of the automobile, and having integrally connected with each end a duplex outwardly and forwardly projecting curved resilient strip portion formed with a looped front connector portion adapted to rearwardly engage and support a buffer front, and a resilient buffer front secured to said connector portions and having free ends extending to and ending at the lateral ends of the buffer.

6. The automobile buffer comprising a laterally extending rear buffer supporting member of steel strip adapted to extend between and be rigidly connected to the frame ends of the automobile, and having integrally connected with each end a duplex forwardly projecting curved resilient strip portion formed with a looped front connector portion adapted to support a buffer front, and a resilient buffer front secured to said connector portions and having free ends extending to and ending at the lateral ends of the buffer.

7. The automobile buffer comprising a multiple laterally extending rear buffer supporting member of tempered spring steel strip adapted to extend between and be connected to the frame of the automobile, and having double laterally and forwardly projecting curved resilient strip portions each comprising a closed loop front connector portion adapted to support a buffer front, and a buffer front adjustably connected to said connector portions and having free ends extending and ending adjacent the lateral ends of the buffer.

8. The automobile buffer comprising a multiple laterally extending rear buffer supporting member of steel strip adapted to extend between and be connected to the frame of the automobile, and having double laterally projecting resilient strip portions each comprising a closed loop connector portion adapted to support a buffer front, and a buffer front adjustably connected to said connector portions and having free ends extending and ending adjacent the lateral ends of the buffer.

9. The automobile buffer comprising a laterally extending rear buffer supporting member of steel strip adapted to extend between and be rigidly connected to the frame of the automobile and having forwardly projecting curved resilient strip portions each formed with a closed looped front connector portion adapted to support a buffer front and a forwardly arched vertically wide multiple strip buffer front having an oppositely bent vertically widened center portion and having closely spaced vertically separated lateral connecting portions adjustably clamped to said connector portions and having outwardly extending rearwardly inclined free ends extending adjacent and forming the lateral ends of the buffer and adapted to extend into protective position adjacent the automobile wheels.

10. The automobile buffer comprising a laterally extending rear buffer supporting member of steel strip adapted to extend between and be rigidly connected to the frame of the automobile, and having forwardly projecting curved resilient strip portions each formed with a closed looped front connector portion adapted to support a buffer front and a forwardly arched vertically wide multiple strip buffer front having a vertically widened center portion and having closely spaced lateral connecting portions clamped to said connector portions and having outwardly extending free ends extending adjacent and forming the lateral ends of the buffer.

11. The automobile buffer comprising a laterally extending rear buffer supporting member of steel strip adapted to be connected to the frame of the automobile and having forwardly projecting resilient looped front connector portions adapted to support a buffer front and a forwardly projecting vertically wide multiple strip buffer front having a vertically widened center portion and clamped to said connector portions and having outwardly extending free ends extending to and ending at the lateral ends of the buffer.

12. The automobile buffer comprising a laterally extending rear buffer supporting member of steel strip adapted to be connected to the frame of the automobile, and having forwardly projecting resilient looped front connector portions adapted to support a buffer front, and a forwardly projecting vertically wide buffer front connected to said connector portions and having outwardly extending free ends extending to and ending at the lateral ends of the buffer.

13. The automobile buffer comprising a laterally extending rear buffer supporting member adapted to be connected to the frame of the automobile, and having forwardly projecting curved resilient strip looped connector portions adapted to support a buffer front, and a forwardly arched spring steel strip buffer front detachably secured to said connector portions and having outwardly and rearwardly extending free ends extending to and forming the lateral ends of the buffer.

14. The automobile buffer comprising a laterally extending rear buffer supporting member adapted to be connected to the frame of the automobile, and having forwardly projecting resilient strip looped connector portions adapted to support a buffer front, and a spring steel buffer front secured to said connector portions and having outwardly extending free ends extending to and forming the lateral ends of the buffer.

15. The automobile buffer comprising laterally extending rear buffer supporting portions of steel strip adapted to be connected to the frame of the automobile, and having doubled laterally and forwardly projecting curved resilient strip portions each formed with a closed loop front connector portion adapted to support a buffer front, and a connected resilient steel buffer front having outwardly extending rearwardly inclined free ends extending to and ending at the lateral ends of the buffer.

16. The automobile buffer comprising laterally extending rear buffer supporting portions adapted to be connected to the frame of the automobile, and having doubled laterally and forwardly projecting resilient strip portions each formed with a closed loop connector portion adapted to support a buffer front, and a connected buffer front having outwardly extending rearwardly inclined free ends extending to and ending at the lateral ends of the buffer.

17. The automobile buffer comprising laterally extending rear buffer supporting portions adapted to be connected to the frame of the automobile, and having forwardly projecting curved resilient strip portions each formed with a looped front connector portion adapted to support a buffer front, and a resilient steel strip buffer front having outwardly extending free ends extending to and ending at the lateral ends of the buffer and adapted to extend into protective position adjacent the automobile wheels.

18. The automobile buffer comprising laterally extending rear buffer supporting portions adapted to be connected to the frame of the automobile, and having forwardly projecting curved resilient portions each formed with a looped connector portion adapted to support a buffer front, and a resilient steel buffer front having free ends extending to and ending at the lateral ends of the buffer and adapted to extend into protective position adjacent the automobile wheels.

GEORGE ALBERT LYON.